United States Patent Office 3,597,500
Patented Aug. 3, 1971

3,597,500
MOLECULAR COMPLEXES OF CARBOXYLIC ACIDS WITH POLYMERIC CYCLIC CARBAMATES
Wilhelm Walles, Midland, Mich., assignor to The Dow Chemical Company, Midland, Mich.
No Drawing. Application Aug. 19, 1966, Ser. No. 573,488, now Patent No. 3,449,339, dated June 10, 1969, which is a continuation-in-part of application Ser. No. 12,254, Mar. 2, 1960. Divided and this application Feb. 4, 1969, Ser. No. 796,593
Int. Cl. C08f 7/12, 27/00
U.S. Cl. 260—895
1 Claim

ABSTRACT OF THE DISCLOSURE

Complex obtained by mixing a polyvinyl or poly (substituted vinyl) oxazolidinone or oxazinidinone (with certain optional substituents upon the heterocyclic ring) with benzoic acid, salicylic acid, coal acid, p-vinylbenzoic acid, poly-p-vinylbenzoic acid, 2,4-dichlorophenoxyacetic acid, phenoxyacetic acid, or 2,4,5-trichlorophenoxyacetic acid; manifesting uses similar to those of the said acids when not in complex form, but with improved physical properties such as solubility.

This is a division of my copending application Ser. No. 573,488, filed Aug. 19, 1966, now Pat. No. 3,449,339, which is a continuation-in-part of Ser. No. 12,254, filed Mar. 2, 1960 and now abandoned.

According to the present invention I have invented certain novel complexes possessing remarkable stability. All the present complexes have, in common, the property that each of them comprises, as one member of the complex, a cyclic carbamate compound, and as the other member another organic compound comprising at least a cation, that is to say, an electropositive moiety, and a negative organic radical.

The known noun *complex* is used herein in strict accord with one of its known meanings, to designate, in a generic or specific sense, a composition of matter such as those of the present invention; a substance composed of separate molecules bonded together by forces not so strong as conventional covalent bonds but stronger than hydrogen bonding, and strong enough that not only are the present complexes stable under ordinary conditions of preparation, storage, and employment, but also they confer stability on the behaviour of their members.

The bonding of the present complexes arises when candidate substances to become members of the complex are brought into contact one with another, and occurs without addition to or subtraction from any compound of any atom.

The noun *complectant* is used generically to designate a molecular chemical substance which may be caused to unite with a compound comprising a cationic, that is to say, an electropositive moiety and a negative organic group in preparation of the present complexes. The complectant is, in general, the material whose properties have been observed to have the greater effect (of the effects of at least two kinds of components of the resulting complex) upon the solubility, stability, physical state, and many other physical properties of the said complex, and is common to many different kinds of complex. All the present complectants are cyclic carbamate compounds.

The noun *complectate* is used in the present specification and claims to designate an organic chemical substance other than the complectant, a molecule of which comprises at least a cation, that is to say a positive moiety, and a negative group, which unites with the complectant in the preparation of the present complexes; the complectate is the material whose properties have frequently been observed to have the greater effect (of the effects of the two kinds of members of the resulting complex) upon many chemical and particularly biochemical properties of the complex. The properties of complectates are dependably stabilized. Volatility, if any, is suppressed. Toxicity is reduced. Routine chemical reactivity is not affected.

In view of these definitions, the present invention relates to novel complexes of which the complectants are cyclic carbamate compounds of which oxazolidinone and oxazinidinone are representative, and designated by the formula.

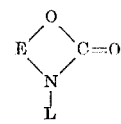

wherein O is the symbol for oxygen, C is the symbol for carbon, N is the symbol for nitrogen, the foregoing being conventional symbols, and wherein E represents a divalent group which, in every occurrence, introduces either two or three carbon atoms at the indicated heterocyclic ring site between nitrogen and oxygen, and may be ethylene (dimethylene), trimethylene, methylethylene (Isopropylene), 1,2 - dimethylethylene (2,3 - n-butylene), 1,3-amylene, 2,3 - amylene, 2,4 - amylene, 1,2 - hexylene, 2,4 - hexylene, 2,3 - hexylene, 3,4 - hexylene; cyclohexyl ethylene, phenylethylene, 1 - phenyl-1,3 - propylene, 1-phenyl - 1,2 - propylene, (p-tolyl)ethylene, 2 - (o-tolyl)-1,3-trimethylene.

By known addition polymerization of vinyl, allyl, or isopropenyl, L can become a group

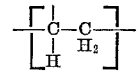

or

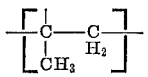

or

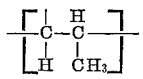

and the resulting compounds are polymers upon each second carbon of which recurs a group

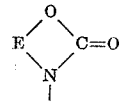

The polymers are typically of K-values according to Fikentscher of from about 2 to about 200.

The complectates are organic compounds containing hydrogen attached to a negative, that is to say, an anionic organic group. The negative or anionic organic groups are those generally recognized by chemists, for example as defined in Hackh's Chemical Dictionary by Grant, (McGraw-Hill Book Company, New York, 3rd edition, 1944) page 565, see "negative group," second meaning. Within the scope of the definition, the negative groups to be employed are those which exclude inorganic groups.

No byproduct is formed as a result of preparation of the instant complexes. By the employment of stoichiometric amounts of pure starting materials it is possible to prepare the present complexes in pure form. If the complectant be employed in excess, a resulting pure but unsatisfied complex will be prepared. If complectate be employed in excess, a resulting complex impure by reason of surplus complectate will be prepared. In the latter instance, employment of further complectant wherewith to prepare further complex binds the excess complectate, obviating need for other means of purification.

The utilities of the present complexes are, in general, control of solubility and dispersibility of bound substances in a variety of solvents and non-solvent media, making possible exhibition of desirable properties deriving from the complectate but not otherwise available; in a wide range of applications the complexes exhibit useful biological properties deriving from the complectates but greatly attenuated undesired toxic properties of the complectates. Many of the complexes exhibit the useful properties but almost none of the vapor pressure of vapor-producing complectates. The complexes have wide application in chemical purification, extraction, and synthesis. Complexes of good stability are prepared comprising complectates which are chemically unstable; but such complexes usually exhibit desired properties such as biological activities of the complectate. Other useful properties are apparent in the following portions of the present specification.

The complectant materials to be employed according to the present invention, including many of the non-polymeric materials, are readily prepared according to the following general reaction.

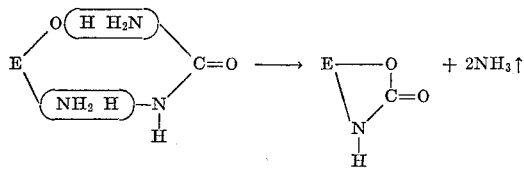

wherein E has the values hereinbefore set forth. By the choice of appropriate starting materials, a choice which, in view of the present teaching, lies readily within the skill of chemists, it is possible to prepare oxazolidinones and substituted oxazolidinones of an extremely wide range.

When it is desired to prepare a cyclic carbamate material the structure of which can be accurately predicted from the identity of the starting materials, the aminoalkanol material to be reacted with urea should, preferably, contain only one hydroxyl group; when only one such hydroxyl group is present the reaction follows the course indicated in the foregoing general reaction. When however, there is employed an amino alkanol material containing more than one hydroxyl group, ring closure and resulting formation of a cycliccarbamate may occur between the urea moiety and the amino alkanol moiety involving one, or, as the case may be, the other hydroxyl site. Thus, various reaction products of uncertain identity may be prepared. However, the reactions of two aminodiols have been studied, and they may be employed with confidence. The oxazolidinone not bearing a substituent upon the ring nitrogen atom may be reacted with an alkenyl alkyl either in dimethyl formamide solvent and in the presence of mercuric acetate catalyst in a known trans-alkenylation reaction whereby to introduce, as substituent upon the ring nitrogen of oxazolidinone, or oxazinadinone, an alkenyl substituent.

The alkenyl-substituted heterocyclic complectant materials may, if desired, be polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis (isobutyronitrile), at a temperature in the range of from 50° to 100° C. When it is desired to obtain the high molecular weight polymers, the polymerization is carried out at a temperature in the lower portion of the polymerization temperature range and with a relatively smaller amount, for example, 0.01 to 0.1 weight percent of catalyst. When it is desired to obtain the various low molecular weight polymers of the present invention, representing a very small number of monomeric moieties, the polymerization is carried out at a temperature in the upper portion of the polymerization temperature range, such as 80°–90° C., and in the presence of a relatively larger amount, for example 2 to 3 weight percent of catalyst. Upon completion of the polymerization, the components of the resulting mixture may if desired be separated according to molecular weight in known manners, such as fractional distillation, centrifugation, and the like.

The present polymers and copolymers, in general, show little or no tendency to be injured by exposure to, for example, sunlight, air, and heat and other influences within a moderate temperature range near to living conditions of animal and vegetable organisms.

The present complectants and, correspondingly, the present complexes may readily be formed into desired shapes and sizes. Such forming is, in general, readily effected by the simple means of subjecting the complectants or complex in granular or pulverulent form to a formative pressure in such known procedures as tableting and the like.

A complex of the present invention was prepared in which the complectate was the polyfunctional compound salicylic acid, which may also be called orthohydroxybezoic acid or orthocarboxyphenol. In the complecting action, the carboxyl group and the hydroxyl group are of relatively similar levels of activity and both are bonded in the resulting complex.

The resulting complex possesses many of the desirable properties characteristics of salicyclic acid but with numerous differences from the uncomplected acid which, in many applications, are advantageous. An illustration of the modification of the behavior of salicyclic acid which resulted from its complection in the present example, is the difference between complectate and complex in toxicity for numerous microorganisms. For example, salicyclic acid inhibits the growth of *Aerobacterium aerogenes, Erwinia carotovora, Salmonella typhosa, Staphylococcus aureus, Pencillium digitatum* and *Rhizopus nigricans*. For this reason, the use of salicylic acid is contraindiciated in many applications wherein it is desired to cultivate or employ the growth of any of these organisms and many other similar organisms. In contrast, the present complex of salicylic acid gave no inhibition of any of the said organisms under laboratory culture test conditions.

Salicylic acid is a well-regarded keratolytic agent. The complex exhibits little or no keratolytic property.

EXAMPLE 1

Complex of salicylic acid and polymeric 5-methyl-3-vinyl oxazolidin-2-one

A solution of salicylic acid in dimethyl formamide was added to an aqueous solution of polymeric 5-methyl-3-vinyl oxazolidin-2-one containing the said polymeric substance in an amount equimolecular (upon a monomeric or cyclic carbamate moiety basis) with the salicylic said complectate. The addition was carried out dropwise, and with continuous stirring at approximately room temperature. At the introduction of each drop, a precipitate formed and, except for the stirring, would have settled in the resulting complection mixture. Upon completion of the addition of the salicylic acid, the resulting preparation was filtered and a solid precipitate removed therefrom, washed with water and gently warmed and dried overnight under atmospheric pressure to vaporize and remove water. As a result of these operations, there was obtained a white powdered complex of polymeric 5-methyl-3-vinyl oxazolidin-2-one with salicylic acid, which, upon analysis, was found to have a composition corresponding to 60.4 percent of the polymeric complectant, 37.8 percent salicylic acid and 1.8 percent water, all by weight of total composition.

The present complexes are formed successfully and useful products result when the aromatic carboxylic acid compounds used as complectates contain, as ring substituents, additional to the said carboxyl groups such other groups as hydroxyl, halogen, hydrocarbon groups including alkyl and aryl groups, nitro groups, amino groups, oxyalkyl groups and others.

The following examples illustrate the complexes of the cyclic carbamates of the sort described with aromatic carboxylic acids.

EXAMPLE 2

Complex of benzoic acid with polymeric 5-methyl-3-vinyl oxazolidin-2-one

A solution of 25 grams benzoic acid dissolved in 125 grams ethanol was added dropwise, with stirring, at room temperature, to 2,000 grams of an aqueous complectant solution containing 5 percent by weight of total solution of polymeric 5-methyl-3-vinyl-oxazolidin-2-one. The polymer had an average molecular weight distribution corresponding to the K-value of 30 according to Fikentscher. As each drop of benzoic acid solution entered the complectant solution, a white precipitate formed. When the stirring was interrupted, briefly, the white precipitate tended to settle in the mixture. Upon the completion of the addition of benzoic acid solution the resulting mixture was filtered and the desired complex removed as a residue solid. The remaining filtrate was free from visible turbidity. Upon analysis, the complex product was found to contain 55.87 percent carbon, 6.86 percent hydrogen and 8.32 percent nitrogen. Of the total weight of the resulting complex, after simple drying in open atmosphere it was found that the complectant comprised 75.5 weight percent, benzoic acid complectate comprised 20.1 weight percent, and water 4.4 weight percent. The infrared spectrum of the complex disclosed no free benzoic acid.

The complex according to the present example was tested for germicidal activity in the saturated agar cup test as described in Example 1–C of the instant specification. As a result of these tests it was determined that the present complex gave complete inhibition of both *Salmonella typhosa* and *Staphylococcus aureus* for a zone of 4 millimeters radius surrounding the recess in the agar plate; and gave complete inhibition of *Aspergillus terreus* and *Penicillium digitatum* at all points with which the complex came into contact and for a zone of 1 millimeter radius surrounding the recess in the agar medium.

The complex is useful for specifically localized application without undesired migration to more remote areas.

EXAMPLE 3

Complex of benzoic acid with polymeric 5-methyl-3-vinyl oxazolidin-2-one

The complex of the present example closely resembles that of Example 3a, foregoing. However, the complectant differs in having a higher average molecular weight as represented by the K-value of Fikentscher of 32; the complex is prepared in a different method wherein the complectant is added to the molten complectate in the absence of solvent.

Benzoic acid having a melting temperature of approximately 123° C. (37.6 grams; approximately 0.31 mole) was gently heated to a temperature above its melting point but not higher than 145° C. To the molten benzoic acid 39.1 grams (approximately 0.307 mole on a monomeric basis) polymeric 5-methyl-3-vinyloxazolidin-2-one was added slowly, portionwise and with continuous stirring. The polymeric complectant, initially a white crystalline powder, appeared to dissolve in the molten benzoic acid. The resulting apparent solution, which was then at temperatures greater than the melting temperature of benzoic acid, was then transferred to a shallow tray wherein it was allowed to cool to approximately room temperature and, during cooling, gradually to solidify, which it did without giving evidence of a sharp freezing temperature. The resulting product was transferred to a high-speed impeller-type mixer ("Waring Blendor"), wherein it was finely subdivided. In finely powdered form it was a white complex of the said starting materials together with a moderate excess of benzoic acid. The assigned structure was confirmed by infrared spectrum analysis.

EXAMPLE 4

Complex of polymeric 5-methyl-3-vinyl-oxazolidin-2-one and coal acids

In the present example various complexes were prepared in which the complectant was polymeric 5-methyl-3-vinyl-oxazolidin-2-one and the complectate was a coal acid composition as defined in U.S. Pat. 2,895,935. See particularly column 1, line 65—column, 2, line 1, and column 6, line 67—column 7, line 11.

The present complectate was a water-soluble solid of a dark brown, nearly black, color, in which no crystal structure was clearly discernible: it was strongly acidic and had an equivalent number of about 73; that is to say, the equivalent of a molecular weight of about 73 for each acidic hydrogen. Actual molecular weight represents a plurality of such equivalents per molecule.

In one preparation, 20 percent aqueous solutions of each of the complectant and complectate were prepared. One hundred milliliters of 20 percent aqueous coal acid solution was poured into 100 milliliters 20 percent aqueous solution of polymeric 5-methyl-3-vinyloxazolidin-2-one. At the interfaces where the solutions came into contact one with another there formed an insoluble complex according to the present invention in the form of a membrane at the interface between the solutions. Formation of the membrane took place almost instantaneously.

The mixture was explored with a glass stirring rod. The membrane was quite thin, elastic, yielding, fairly tough and cohesive. In an attempt to carry the complection to completion the membrane was punctured. At the new interface thus formed, further such membrane formed. Repeated efforts to stir the mixture led to further production of such membranous complex at the interfaces at which the solutions came in contact one with another, and in the resulting mixture the starting material solutions became irregularly divided into disparate bullate fluid inclusions within a disordered mass of the said membrane.

By contacting the solutions together in an orderly manner and removing the resulting film or membrane as formed, it is possible to remove the complex membrane as a continuous strip, filament, or sheet. It may thereafter be used as prepared, or dried intact, dried and pulverized, and the like. When moist, contacting surfaces of the said membrane tend to cohere one with the other.

In a further preparation, 200 milliliters 5 percent aqueous solution of polymeric 5-methyl-3-vinyloxazolidin-2-one were mixed and stirred into 200 milliliters 5 percent aqueous solution of coal acids of the sort described. A precipitate promptly formed and settled immediately leaving an orange-yellow supernatant liquid. The precipitate was a tan to brown semi-solid "cheesy" complex of the said starting material.

Each of the foregoing materials was finely subdivided and dispersed in a large excess of water at room temperature and found to be soluble at a concentration of 0.1 percent by weight of water.

The infrared spectrum of the complex shows the almost complete absence of free carboxyl groups as contrasted with the spectrum of the starting coal acids which indicates an average of from 2.5 to 5 carboxyl groups per average molecule of molecular weight approximately 250.

An infrared scan of a portion of a liquid filtrate from which the said solid complex is removed by filtration discloses the presence, in the filtrate, of a second coal acids complex comprising complectant in a much higher weight proportion than the composition of the said precipitate complex. The said water-soluble complex is recovered by evaporation of solvent water. The said water-soluble complex is found also to be a near-white solid which, after grinding, is a free-flowing granular to powdered material.

The coal acid complectates of the present examples are shown in the said patent pertaining thereto to be useful in the preparation of bonding agents which are in the nature of cross-linked polyester resin materials which are desirably employed as binders in the preparation of molds or forms from particulate material such as sand molds. In such procedure the coal acids together with an alcohol which may desirably be a polyhydroxy aromatic alcohol are mixed and blended together with the particulate material such as foundry molding sand in the presence of moisture, formed to a desired shape, and thereafter dried and "cured," that is to say, exposed to heat for a period of time sufficient to effect the desired poly-esterification reaction between the coal acids and the, for example, polyhydroxyaromatic alcohol. Thereafter the mold is ready for employment. This method suffers the disadvantage that there is an interval after the mixture and forming of the mold and before curing has been effected in which the mold is susceptible of deformation, breakage, and the like, having, in the uncured condition, a very low strength.

When there is employed a complex according to the present example instead of the uncomplected coal acids, either of two improvements in this condition is available. When, for any reason, it is desired to form the molding sand together with bonding materials in the presence of moisture, the present complex renders the resulting moist mold distinctly more tenacious and cohesive, representing a distinctly advantageous increase in physical strength before curing. This may be enhanced by the employment of an unsatisfied coal acids complex wherewith the polyhydroxyaromatic reactant which is to esterify the coal acids may also join the present complex. When it is desired to prepare and shape the desired mold in the absence of moisture the employment of a coal-acids complex of the present example renders the pressure-formed composition distinctively tenacious and cohesive in the absence of moisture. Moreover, the presence of the said complex renders the sand composition readily formable and reformable without loss of cohesion in the resulting formed and reformed uncured mold.

The said tenacity is sufficiently great that the thus-prepared mold may be lightly used without curing.

EXAMPLE 5

Complex of p-vinylbenzoic acid and polymeric 5-phenyl-3-vinyloxazolidin-2-one polymerized in complex In the present example a complex is first formed between the polymeric complectant and the monomeric complectate. Thereafter, without breaking the complex, the said monomer is polymerized, giving rise to a polymer-polymer complex prepared in situ.

The present complectant is a polymer of 5-phenyl-3-vinyloxazolidin-2-one of which the monomer is a solid melting at 79.5–80.5° C. The polymer does not exhibit a sharp melting temperature but softens gradually at temperatures in the vicinity of 100° C. and liquifies entirely to a viscous liquid at temperatures below 200° C.

In preparing the instant complex, separate solutions in xylene are prepared, one containing the monomeric complectate and the other an equimolecular amount, upon the basis of cyclic carbamate moieties, of polymeric complectant. The solutions are prepared at room temperature. The resulting solutions are gently mixed and stirred together to effect complete dispersion of each in the other, whereupon the complex promptly forms. The resulting solution is then evaporated to dryness at room temperature and under sub-atmospheric pressures to remove solvent and obtain a colorless to white solid complex of polymeric 5-phenyl-3-vinyloxazolidin-2-one and p-vinylbenzoic acid; the complection involves the carboxyl moiety of the complectate and the cyclic carbonyl group and adjacent atoms of the complectant carbamate moieties; complectate vinyl groups are essentially unencumbered and free to react.

The polymer-monomer complex thus prepared is then gradually warmed in dimethyl formamide solvent. The resulting mixture liquifies to a colorless fluid at a temperature below 150° C. Under these conditions, a small conventional amount of polymerization catalyst (benzoyl peroxide) is added whereupon the vinyl groups of the complectate p-vinylbenzoic acid polymerize. The polymerization is accompanied by an increase in viscosity of the resulting solution. When polymerization has gone forward to the desired degrees, the entire mixture is dispersed slowly and with stirring into water at approximately room temperature, whereby the dimethylformamide solvent is dispersed as an aqueous solution in which the polymer-polymer complex precipitates. The complex is thereafter recovered by filtration, washed with water, and dried to obtain a complex of polymeric p-vinylbenzoic acid with polymeric 5-phenyl-3-vinyloxazolidin-2-one as a white, finely divided granular material exhibiting no distinct melting temperatures but decomposing with heating at temperatures not much above 300° C.

An aryloxyaliphatic acid of which the oxyaliphatic straight chain is of not more than 3 atoms of carbon and one atom of oxygen whereby the carboxyl group is separated from the aromatic nucleus by not more than 4 atoms in an oxyaliphatic chain; and the ion of the sort formed from the dissociation of such acid are complectates of the present invention.

EXAMPLE 6

Complex of polymeric 5-methyl-3-vinyloxazolidin-2-one and 2,4-dichlorophenoxyacetic acid A solution of 50 grams 2,4-dichlorophenoxyacetic acid in 250 milliliters ethanol at room temperature was added dropwise, with continuous mixing and stirring to 4,000 grams of aqueous 5 weight percent solution of polymeric 5-methyl-3-vinyloxazolidin-2-one. The polymeric vinyloxazolidinone was of an average molecular weight corresponding to a Fikentscher K-value of 30. As the 2,4-dichlorophenoxy acetic acid solution entered the polymer solution a white gelatinous precipitate was formed. Upon completion of the combination of complectant and complectate, the resulting mixture, which was colloidal in nature, was frozen and cooled to a temperature of minus 30° C. for approximately 24 hours, to break the colloidal dispersion.

The mixture was thereafter warmed to room temperature and filtered, and the white solid filtrate air-dried. As a result of these operations there was obtained an essentially dry polymolecular complex of poly-5-methyl-3-vinyloxazolidin-2-one and 2,4-dichlorophenoxyacetic acid. The aqueous filtrate from which the product was removed contained further portions of the complex, as was evidenced by its distinctly milky appearance. Such portions are removed if desired, by refreezing and refiltering, or by filtration through an ultrafilter. The resulting complex product was found upon analysis, to comprise 28.8 percent by weight 2,4-dichlorophenoxyacetic acid and 71.2 percent by weight polymeric 5-methyl-3-vinyloxazolidin-2-one, corresponding to an average of 4.3 carbamate units in the complectant per complectate molecule.

The product of the presenth example was tested for herbicidal activity against numerous species of plants, both monocotyledonous and dicotyledonous and in such tests, was found to be a highly effective herbicide. In a representative operation, the application to an area of land heavily infected with seeds of pigweed (Amaranthus species) of an aqueous dispersion of the present complex product at such rate that the soil area received the equivalent of 5 pounds of the said complex, corresponding to 1.48 pounds of acid complectate, per acre, effected a complete, that is to say, 100 percent, kill of the germinant seeds and emerging seedlings of the pigweed. In an operation similar in all respects except that the test plant was of a common grass weed "foxtail" (Setaria italica) there was effected a 100 percent kill of the seeds and emergent seedlings. When the test organism was crabgrass (Digitaria spp.) the resulting control of the crabgrass seeds was found to be 98 percent. Similarly, the complex was found to be highly effective in the control of vegetation of numerous other species.

The present complectate is a commercial herbicide of very great importance. Its use has been severely limited, in many applications, by the fact that from most known preparations employing it, sufficient herbicidal vapor escapes to cause injury to sensitive vegetation nearby. Thus, for example, its use near to roses, grapes, cotton, and numerous other desirable ornamental plants is seriously restricted. The escaping vapor can almost always be detected by its distinctive odor. The present complex has the important advantage over the uncomplected herbicidal complectate that the complex has no significant measureable escape of vapor. Thus, the present complex is successfully and safely employed by direct topical application to undesired vegetation growing adjacent sensitive desirable growth.

EXAMPLE 7

Complex of polymeric 5-methyl-3-vinyloxazolidin-2-one and phenoxyacetic acid

In procedures essentially the same as those of Example 4, foregoing, a complex was prepared employing, as complectant, further portions of the same complectant as in Example 4 and as complectate, phenoxyacetic acid. The resulting complex was, after simple air-drying, a white, non-hygroscopic, apparently dry, free-flowing powder comprising 80 percent complectant, 17.1 percent complectate, and 2.9 percent water, all by weight of total complex. The said complex was tested for microbiocidal activity in the standard agar cup test method as described hereinbefore, and found to inhibit *Staphylococcus aureus, Salmonella typhosa, Penicillium digitatum,* and *Aspergillus terreus,* at all points with which the said complex came in contact, and for a radial zone of varying distance therefrom, outward. The said complex was practically odorless; and exhibited negligible vapor pressure.

EXAMPLE 8

Complex of polymeric 5-methyl-3-vinyloxazolidin-2-one and 2,4,5-trichlorophenoxyacetic acid In procedures essentially the same as those in Example 4, there was prepared a complex of polymeric 5-methyl-3-vinyloxazolidin-2-one and 2,4,5-trichlorophenoxyacetic acid. The resulting complex was a white, free-flowing, non-hygroscopic, finely divided solid of approximately 41 weight percent complectate, corresponding to 1 molecule of complectate for each 2.9 carbamate units of polymeric complectant. Confirmation that the said product was a complex rather than a simple mixture or solution in solid phase of the starting materials was confirmed by both vapor pressure studies and infrared spectrum analysis.

The resulting complex product was tested for various biological activities and found to be a herbicide useful to kill seeds, germinant seeds and emergent seedlings, and to kill living plants when employed by foliage application. The complex was found also to inhibit the growth of *Staphylococcus aureus, Salmonella typhosa, Aspergillus terreus,* and *Penicillium digitatum* in a standard agar cup test.

The uncompleted complectate is well known commercially as a herbicide the use of which in many applications is contraindicated because of danger that escaping herbicidal vapors will cause injury to sensitive adjacent desired vegetation. The complex of the instant vapors exhibits negligible vapor pressure. In uses in which the danger of vapor injury contraindicates use of the present complectate, the complex of the present example may often be successfully employed.

I claim:
1. Complex which is the product of mixing together a compound of the formula

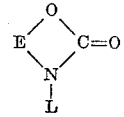

wherein O is the symbol for oxygen, C is the symbol for carbon, N is the symbol for nitrogen, and wherein E represents a divalent moiety selected from ethylene, trimethylene, methylethylene, 1,2-dimethylethylene, 1,3-amylene, 2,3-amylene, 2,4-amylene, 1,2-hexylene, 2,4-hexylene, 2,3-hexylene, 3,4-hexylene; cyclohexyl ethylene, phenylethylene, 1-phenyl - 1,3 - propylene, 1-phenyl-1,2-propylene, (p-tolyl)ethylene, 2-(o-tolyl)-1,3-trimethylene, L is a group

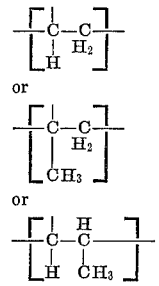

and the resulting compounds are polymers upon an average of about each second carbon of which recurs a group

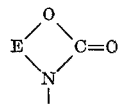

with benzoic acid, salicylic acid, coal acid, p-vinylbenzoic acid, poly-p-vinylbenzoic acid, 2,4-dichlorophenoxyacetic acid, phenoxyacetic acid, or 2,4,5-trichlorophenoxyacetic acid:

said polymer being of a K-value according to Fikentscher of from about two to about two hundred.

References Cited

UNITED STATES PATENTS 2,873,192   2/1959   Walles et al. _____ 99—28

OTHER REFERENCES

Drechsel, J. Org. Chem. 22, 849–51 (1957).

Higuchi et al., J. Am. Pharm. Soc., Sci. Ed., 43, 393–401 (1954).

MELVIN GOLDSTEIN, Primary Examiner

U.S. Cl. X.R.

260—47, 77.5; 886